(12) United States Patent
Nozawa et al.

(10) Patent No.: US 10,414,429 B2
(45) Date of Patent: Sep. 17, 2019

(54) STEERING CONTROL SYSTEM

(71) Applicant: JTEKT CORPORATION, Osaka-shi, Osaka (JP)

(72) Inventors: Tetsuya Nozawa, Okazaki (JP); Shigeto Matsuo, Kako-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 128 days.

(21) Appl. No.: 15/448,051

(22) Filed: Mar. 2, 2017

(65) Prior Publication Data
US 2017/0259845 A1    Sep. 14, 2017

(30) Foreign Application Priority Data

Mar. 10, 2016 (JP) .................................. 2016-047400

(51) Int. Cl.
*B62D 5/04* (2006.01)

(52) U.S. Cl.
CPC ........... *B62D 5/0463* (2013.01); *B62D 5/049* (2013.01); *B62D 5/0472* (2013.01); *B62D 5/0484* (2013.01)

(58) Field of Classification Search
CPC .... B62D 5/0463; B62D 5/049; B62D 5/0484; B62D 5/0472
See application file for complete search history.

(56) References Cited

U.S. PATENT DOCUMENTS

| 4,759,212 A | * | 7/1988 | Sawada | ............... | G01M 15/046 |
| | | | | | 73/115.02 |
| 5,457,632 A | * | 10/1995 | Tagawa | .................... | B62D 6/04 |
| | | | | | 180/446 |
| 2001/0052756 A1 | | 12/2001 | Noro et al. | | |
| 2002/0166714 A1 | | 11/2002 | Murata et al. | | |

(Continued)

FOREIGN PATENT DOCUMENTS

| EP | 0531870 A2 | 3/1993 |
| EP | 0872406 A2 | 10/1998 |

(Continued)

OTHER PUBLICATIONS

Jul. 12, 2017 Extended Search Report issued in European Patent Application No. 17159317.1.

*Primary Examiner* — Jerrah Edwards
*Assistant Examiner* — Mathew Franklin Gordon
(74) *Attorney, Agent, or Firm* — Oliff PLC

(57) ABSTRACT

The microcomputer calculates a first assist component based on a vehicle speed value and a steering torque, calculates a rotation angle command value based on at least the vehicle speed value and a first assist component, and calculates a second assist component by adjusting a rotation angle to the rotation angle command value through feedback control. The microcomputer sets a limited state 1 where the second assist component is disabled when a vehicle is stationary. During an abnormality determination period during which the vehicle speed value is determined to be abnormal, the microcomputer sets the vehicle speed value to a provisional (Continued)

vehicle speed value. Further, in a limited state 2 that is set when the vehicle is stationary during the abnormality determination period, the microcomputer calculates the first assist component based on a provisional vehicle speed value, and disables the second assist component.

6 Claims, 5 Drawing Sheets

(56) References Cited

U.S. PATENT DOCUMENTS

| | | | |
|---|---|---|---|
| 2009/0048735 A1* | 2/2009 | Guegan | B62D 7/148 |
| | | | 701/42 |
| 2013/0311044 A1 | 11/2013 | Tamaizumi et al. | |
| 2014/0005894 A1* | 1/2014 | Aoki | B62D 5/0484 |
| | | | 701/43 |
| 2014/0081525 A1* | 3/2014 | Itamoto | B62D 5/0484 |
| | | | 701/42 |
| 2014/0297123 A1* | 10/2014 | Nozawa | B62D 6/04 |
| | | | 701/41 |

FOREIGN PATENT DOCUMENTS

| | | |
|---|---|---|
| EP | 2749477 A2 | 7/2014 |
| EP | 2757022 A1 | 7/2014 |
| WO | 2012/133590 A1 | 10/2012 |

* cited by examiner

FIG.5

| VEHICLE SPEED VALUE V | | TRAVELING STATE | FIRST ASSIST COMPONENT Ta1* | SECOND ASSIST COMPONENT Ta2* |
|---|---|---|---|---|
| NORMAL | | TRAVELING | CALCULATED BASED ON VEHICLE SPEED VALUE V | CALCULATED BASED ON VEHICLE SPEED VALUE V |
| | | STATIONARY | | CALCULATE SECOND ASSIST COMPONENT Ta2* AS ZERO |
| ABNORMAL | | TRAVELING | CALCULATED BASED ON PROVISIONAL VEHICLE SPEED VALUE V0 | CALCULATED BASED ON PROVISIONAL VEHICLE SPEED VALUE V0 |
| | | STATIONARY | | CALCULATE SECOND ASSIST COMPONENT Ta2* AS ZERO |

STEERING CONTROL SYSTEM

INCORPORATION BY REFERENCE

The disclosure of Japanese Patent Application No. 2016-047400 filed on Mar. 10, 2016 including the specification, drawings and abstract, is incorporated herein by reference in its entirety.

BACKGROUND OF THE INVENTION

1. Field of the Invention

The invention relates to a steering control system.

2. Description of the Related Art

A steering system configured to assist a user's operation of a steering wheel is described in, for example, WO 2012/133590. WO 2012/133590 describes a steering system that adjusts a rotation angle of a pinion shaft of a rack-and-pinion mechanism to a pinion angle command value through feedback control (hereinafter, referred to as "rotation angle feedback control"). The rack-and-pinion mechanism mechanically couples a steering wheel of a steering mechanism of a vehicle to steered wheels. Through the rotation angle feedback control, the steering system described in WO 2012/133590 achieves favorable steering characteristics while reducing reverse input vibrations transmitted from the steered wheels, when assisting the user's operation of the steering wheel.

Further, the steering system described in WO 2012/133590 calculates a road information controlled variable as a compensation component for increasing or decreasing a controlled variable of the rotation angle feedback control, based on a vehicle speed value that is a detected value obtained by a vehicle speed sensor. Through the rotation angle feedback control, the rotation angle of the pinion shaft is controlled to be adjusted to a pinion angle command value calculated based on an ideal model for a rotary shaft that rotates in response to a load (steering torque) applied to the steering wheel, in order to reduce the reverse input vibrations transmitted from the steered wheels. Thus, for example, when the vehicle is stationary, the steering system described in WO 2012/133590 offsets the controlled variable of the rotation angle feedback control with the road information controlled variable, thereby substantially disabling the rotation angle feedback control. This allows the user to appropriately perform an operation of the steering wheel (so-called stationary steering (i.e., dry steering being the act of turning the steering wheel of a vehicle while the vehicle is stationary)).

In the steering system described in WO 2012/133590, when a vehicle speed value is abnormal, the accuracy of the compensation component for increasing or decreasing the controlled variable of the rotation angle feedback control may be reduced. For example, due to abnormality of a vehicle speed value, the vehicle may be regarded as being traveling although the vehicle is actually stationary. This prevents the rotation angle feedback control from being substantially disabled. That is, when the vehicle speed value is abnormal, there is a possibility that the user cannot appropriately perform an operation of the steering wheel.

SUMMARY OF THE INVENTION

An object of the invention is to provide a steering control system that allows a user to appropriately perform an operation of a steering wheel even when a vehicle speed value is abnormal.

An aspect of the invention relates to a steering control system including a steering operation processing circuit that controls a controlled variable for a motor so as to apply a steering force for steering steered wheels to a steering device in response to an operation of a steering wheel. The steering operation processing circuit includes: a basic controlled variable calculation circuit that calculates a first component that is a basic component of the controlled variable for the motor, based on a vehicle speed value that is a detected value of a traveling speed of a vehicle and a steering torque that is a detected value of a load applied to the steering wheel; a rotation angle command value calculation circuit that calculates a rotation angle command value for a rotary shaft based on at least the vehicle speed value and the first component, the rotation angle command value being convertible into a steered angle of the steered wheels; a feedback calculation processing circuit that calculates a second component of the controlled variable for the motor by adjusting a rotation angle of the rotary shaft to the rotation angle command value through feedback control, the rotation angle of the rotary shaft being a detected value; a control processing circuit that controls an operation of the motor based on the controlled variable for the motor, the controlled variable including the first component and the second component; and a limited-state setting circuit that sets a first limited state when the vehicle speed value is equal to or lower than a reference vehicle speed value that is a reference value at and below which it is determined that the vehicle is not traveling, the first limited state being a state where a variation range of the second component is more limited than when the vehicle speed value is higher than the reference vehicle speed value. The steering operation processing circuit sets the vehicle speed value to a provisional vehicle speed value that is higher than the reference vehicle speed value, during an abnormality determination period during which the vehicle speed value is determined to be abnormal. The basic controlled variable calculation circuit calculates the first component based on the provisional vehicle speed value during the abnormality determination period. During the abnormality determination period, the limited-state setting circuit sets a second limited state where the variation range of the second component is more limited than when the vehicle speed value is not abnormal.

With the above-described configuration, when the vehicle speed value is equal to or lower than the reference vehicle speed value that is the reference value at and below which it is determined that the vehicle is not travelling, the influence of the second component, that is, the influence of the feedback control of the rotation angle (hereinafter, referred to as "rotation angle feedback control") on an operation of the steering wheel is limited. That is, for example, when the vehicle is stationary, the influence of the rotation angle feedback control on a user's operation of the steering wheel is limited to allow the user to appropriately perform an operation of the steering wheel.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 5 is a table illustrating manners of calculating a first assist component and a second assist component based on a vehicle speed value and a traveling state of a vehicle.

DETAILED DESCRIPTION OF EMBODIMENTS

Figure 1:
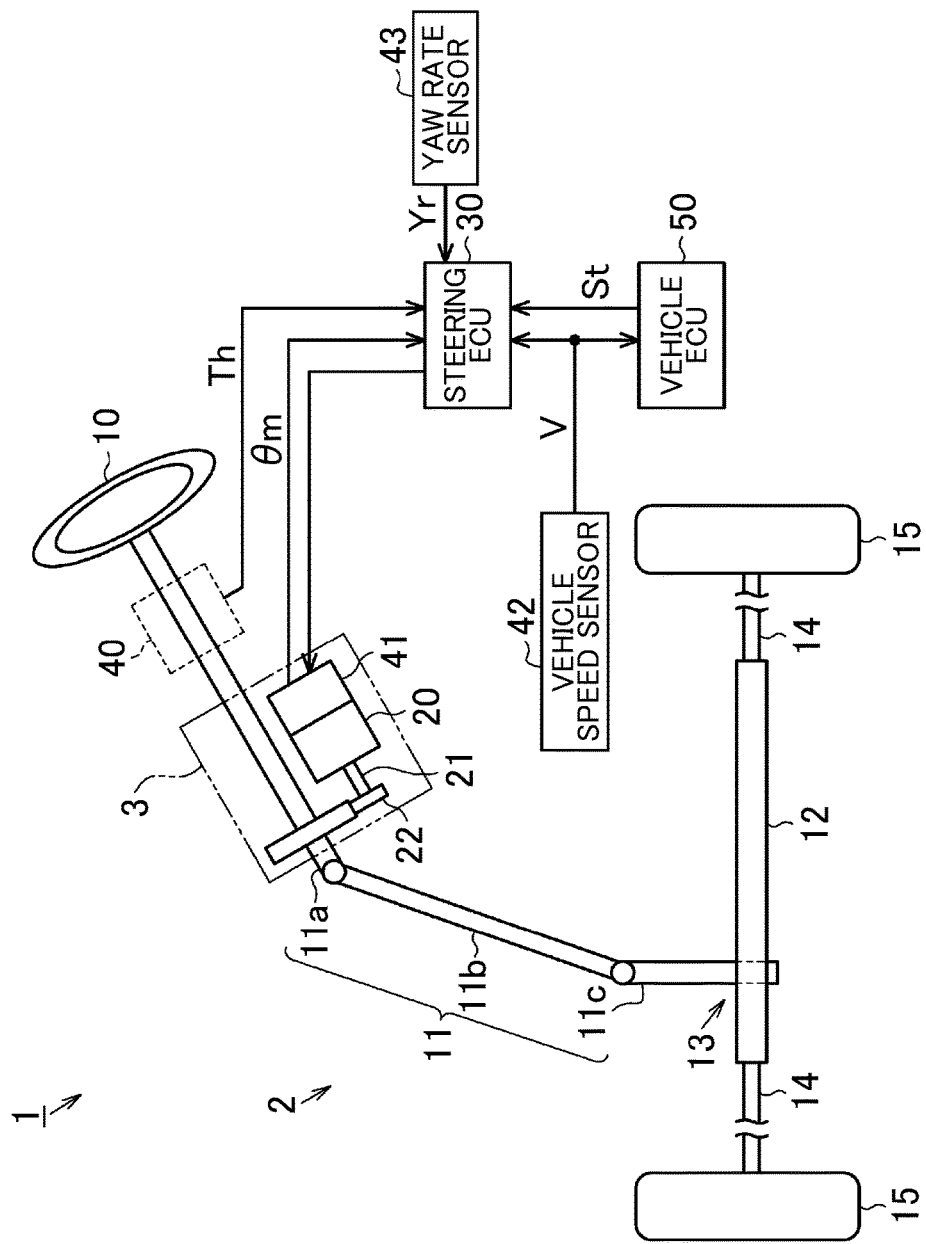
FIG. 1 is a diagram schematically illustrating an electric power steering system.

Hereinafter, an embodiment of a steering control system will be described. As illustrated in FIG. 1, for example, a vehicle is equipped with an electric power steering system 1 (hereinafter, referred to as "EPS 1"). The EPS 1 applies an assist torque to a steering mechanism 2, as a steering force for steering steered wheels 15. The EPS 1 applies an assist torque to the steering mechanism 2 based on a user's operation of a steering wheel 10 to assist the user's operation of the steering wheel 10.

The EPS 1 includes the steering mechanism 2 that steers the steered wheels 15 based on the user's operation of the steering wheel 10, and an assist mechanism 3 that assists the user's operation of the steering wheel 10.

The steering mechanism 2 includes the steering wheel 10, and a steering shaft 11 that rotates in accordance with the rotation of the steering wheel 10. A column shaft 11a, an intermediate shaft 11b, and a pinion shaft 11c constitute the steering shaft 11. The column shaft 11a is coupled to the steering wheel 10. The intermediate shaft 11b is coupled to a lower end of the column shaft 11a. The pinion shaft 11c is coupled to a lower end of the intermediate shaft 11b. A lower end of the pinion shaft 11c is coupled to a rack shaft 12 via a rack-and-pinion mechanism 13. The rack-and-pinion mechanism 13 includes the pinion shaft 11c and the rack shaft 12. With this configuration, the rotary motion of the steering shaft 11 is converted into a reciprocating linear motion of the rack shaft 12 in the axial direction (lateral direction in FIG. 1) via the rack-and-pinion mechanism 13. The reciprocating linear motion is transmitted to the right and left steered wheels 15 via tie rods 14 coupled to respective ends of the rack shaft 12. Consequently, the steered angle of the steered wheels 15 is varied.

The assist mechanism 3 includes a motor 20 that is a source of an assist torque. The motor 20 is, for example, a three-phase brushless motor that rotates based on three-phase (U, V, W) driving electric power. A rotary shaft 21 of the motor 20 is coupled to the column shaft 11a via a speed-reduction mechanism 22. The assist mechanism 3 converts, via the speed-reduction mechanism 22, a rotative force of the rotary shaft 21 of the motor 20 into a force for causing the rack shaft 12 to make a reciprocating linear motion in the axial direction. The axial force applied to the rack shaft 12 serves as an assist force to assist the user's operation of the steering wheel 10.

A steering electronic control unit (ECU) 30 that controls driving of the motor 20 is connected to the motor 20. The steering ECU 30 controls driving of the motor 20, based on detection results from various sensors provided in the vehicle. Examples of the various sensors include a torque sensor 40, a rotation angle sensor 41, a vehicle speed sensor 42, and a yaw rate sensor 43. The torque sensor 40 is provided on the column shaft 11a. The motor 20 is provided with the rotation angle sensor 41. The torque sensor 40 detects a steering torque Th that is a load applied to the steering shaft 11 in response to the user's operation of the steering wheel 10. The rotation angle sensor 41 detects a motor angle θm of the rotary shaft 21 of the motor 20. The vehicle speed sensor 42 detects a vehicle speed value V that is a traveling speed of the vehicle. The yaw rate sensor 43 detects a rotation angular velocity around a vertical axis passing through the center of gravity of the vehicle, that is, a yaw rate Yr. The steering ECU 30 sets a target assist torque based on outputs from the sensors, and controls electric currents to be supplied to the motor 20 such that an actual assist torque coincides with the target assist torque. The steering ECU 30 is an example of a steering control system.

A vehicle electronic control unit (ECU) 50 mounted in the vehicle is connected to the steering ECU 30. The vehicle ECU 50 determines (detects) an abnormality caused in the vehicle, and provides an instruction to the steering ECU 30. The vehicle ECU 50 receives the vehicle speed value V from the vehicle speed sensor 42. The vehicle ECU 50 determines especially an abnormality of the vehicle speed sensor 42, that is, an abnormality of the vehicle speed value V, among abnormalities caused in the vehicle. For example, the vehicle ECU 50 determines that the vehicle speed value V is abnormal, when the vehicle speed value V is stuck at a particular value.

Figure 2:
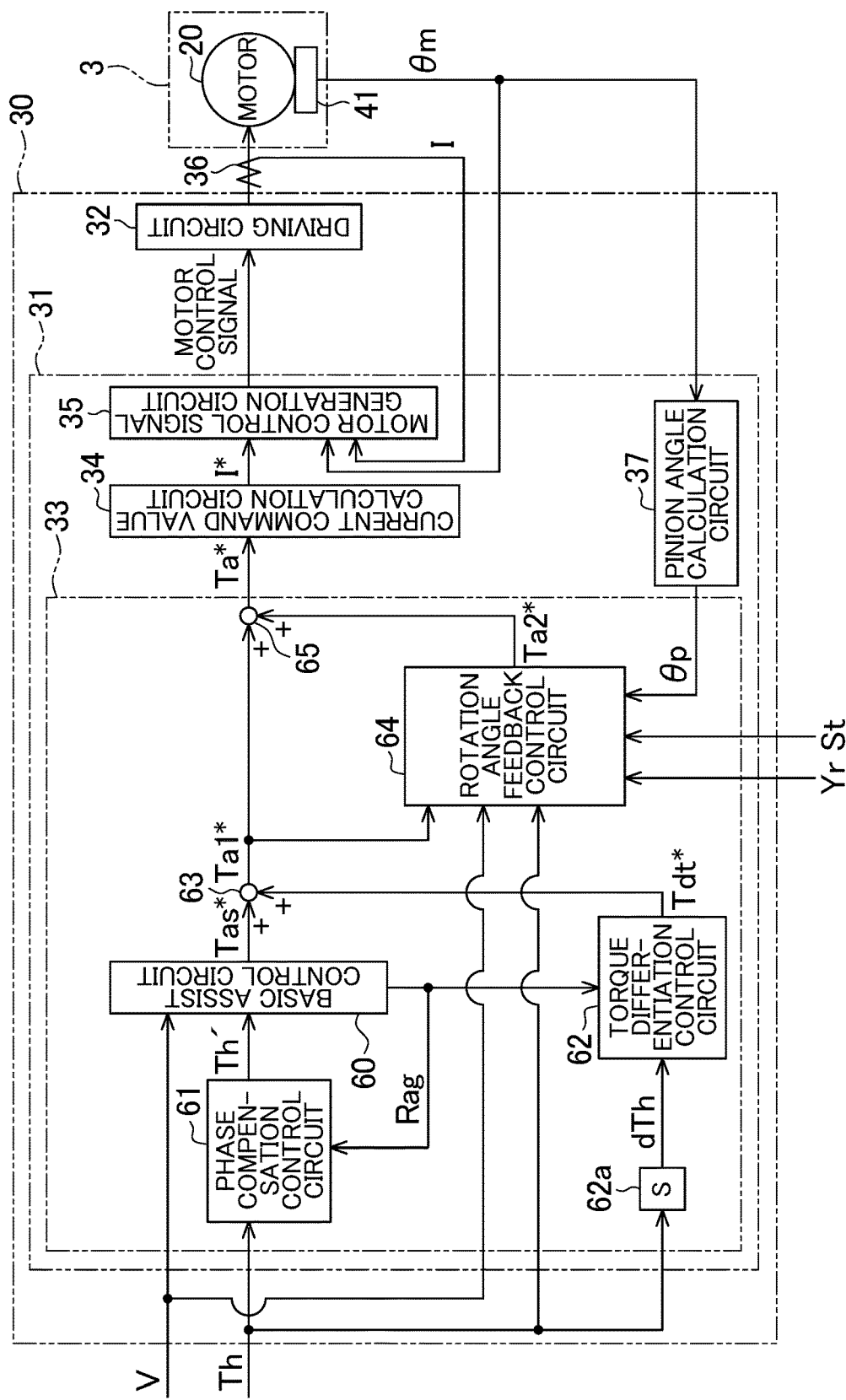
FIG. 2 is a block diagram illustrating an electrical configuration of the electric power steering system.

Next, an electric configuration of the steering ECU 30 will be described. As illustrated in FIG. 2, the steering ECU 30 includes a microcomputer 31 that generates a motor control signal, and a driving circuit 32 that supplies an electric current to the motor 20 as driving electric power based on the motor control signal.

The microcomputer 31 includes an assist command value calculation circuit 33, a current command value calculation circuit 34, and a motor control signal generation circuit 35. The assist command value calculation circuit 33 calculates an assist command value Ta* based on the steering torque Th and the vehicle speed value V that are obtained from the torque sensor 40 and the vehicle speed sensor 42, respectively. The assist command value Ta* is an assist component corresponding to an assist torque to be generated by the motor 20. Based on the assist command value Ta*, the current command value calculation circuit 34 calculates a current command value I* indicating a current value that is a controlled variable for the motor 20. The motor control signal generation circuit 35 generates a motor control signal by executing current feedback control such that an actual current value I follows the current command value I*, based on the actual current value I detected by a current sensor 36 provided on a feeding path extending from the driving circuit 32 to the assist mechanism 3 and the motor angle θm detected by the rotation angle sensor 41. The microcomputer 31 is an example of a steering operation processing circuit. The current command value calculation circuit 34 and the motor control signal generation circuit 35 are each an example of a control processing circuit.

The assist command value calculation circuit 33 includes a basic assist control circuit 60 that calculates a basic assist controlled variable Tas* as a basic component of the assist command value Ta*. The assist command value calculation circuit 33 includes a phase compensation control circuit 61 that calculates a steering torque Th' as a compensation component by executing phase compensation (phase retarding compensation) so as to retard the phase of the steering torque Th. The basic assist control circuit 60 calculates the basic assist controlled variable Tas* based on the vehicle speed value V and the steering torque Th' obtained through the phase compensation executed by the phase compensation control circuit 61. The basic assist control circuit 60 calculates the basic assist controlled variable Tas* in such a manner that the calculated basic assist controlled variable Tas* has a larger absolute value as the absolute value of the steering torque Th' is larger and the vehicle speed value V is lower. In particular, in the relationship between the basic assist controlled variable Tas* and the steering torque Th', the rate of variation in the basic assist controlled variable Tas* with respect to a certain variation in the steering torque Th' is higher as the steering torque Th' is larger. That is, an assist gradient Rag that is a rate of variation in the basic assist controlled variable Tas* with respect to a certain variation in the steering torque Th' is higher as the steering torque Th' is larger.

The basic assist control circuit 60 outputs the assist gradient Rag, which corresponds to the steering torque Th' and the vehicle speed value V, to the phase compensation control circuit 61. The phase compensation control circuit 61 calculates the steering torque Th' obtained through the phase compensation, based on the assist gradient Rag, and outputs the steering torque Th' to the basic assist control circuit 60. For example, the phase compensation control circuit 61 varies characteristics so as to decrease a gain (dB) for the steering torque Th' with an increase in the assist gradient Rag. The gain (dB) is used in the phase compensation for the steering torque Th. The basic assist control circuit 60 is an example of a basic assist controlled variable calculation circuit.

The assist command value calculation circuit 33 includes a torque differentiation control circuit 62 that calculates a torque differentiation controlled variable Tdt* as a compensation component that causes phase compensation (phase advancing compensation) for advancing the phase of the basic assist controlled variable Tas*. The torque differentiation control circuit 62 receives a torque derivative value dTh that is a derivative value of the steering torque Th calculated by a torque derivative value calculation circuit 62a. The torque differentiation control circuit 62 calculates a torque differentiation basic controlled variable εdt as a basic component of the torque differentiation controlled variable Tdt* based on the torque derivative value dTh. The assist gradient Rag is also input into the torque differentiation control circuit 62. The torque differentiation control circuit 62 calculates a system stabilization gain Ksg based on the assist gradient Rag, and calculates the torque differentiation controlled variable Tdt* based on the system stabilization gain Ksg and the torque differentiation basic controlled variable εdt.

A summation processing circuit 63 receives the basic assist controlled variable Tas* calculated by the basic assist control circuit 60 and the torque differentiation controlled variable Tdt* calculated by the torque differentiation control circuit 62. The assist command value calculation circuit 33 generates a first assist component Ta1* based on a value obtained through summation of the basic assist controlled variable Tas* and the torque differentiation controlled variable Tdt*. The first assist component Ta1* is an example of a first component.

The microcomputer 31 includes a pinion angle calculation circuit 37 that calculates a rotation angle θp that is a rotation angle of the pinion shaft 11c based on the motor angle θm of the rotary shaft 21 of the motor 20. The rotation angle θp is used as a rotation angle of a rotary shaft, which can be converted into a steered angle of the steered wheels 15. The assist command value calculation circuit 33 includes a rotation angle feedback control circuit 64 that calculates a second assist component Ta2* by executing feedback control based on the rotation angle θp.

Figure 3:
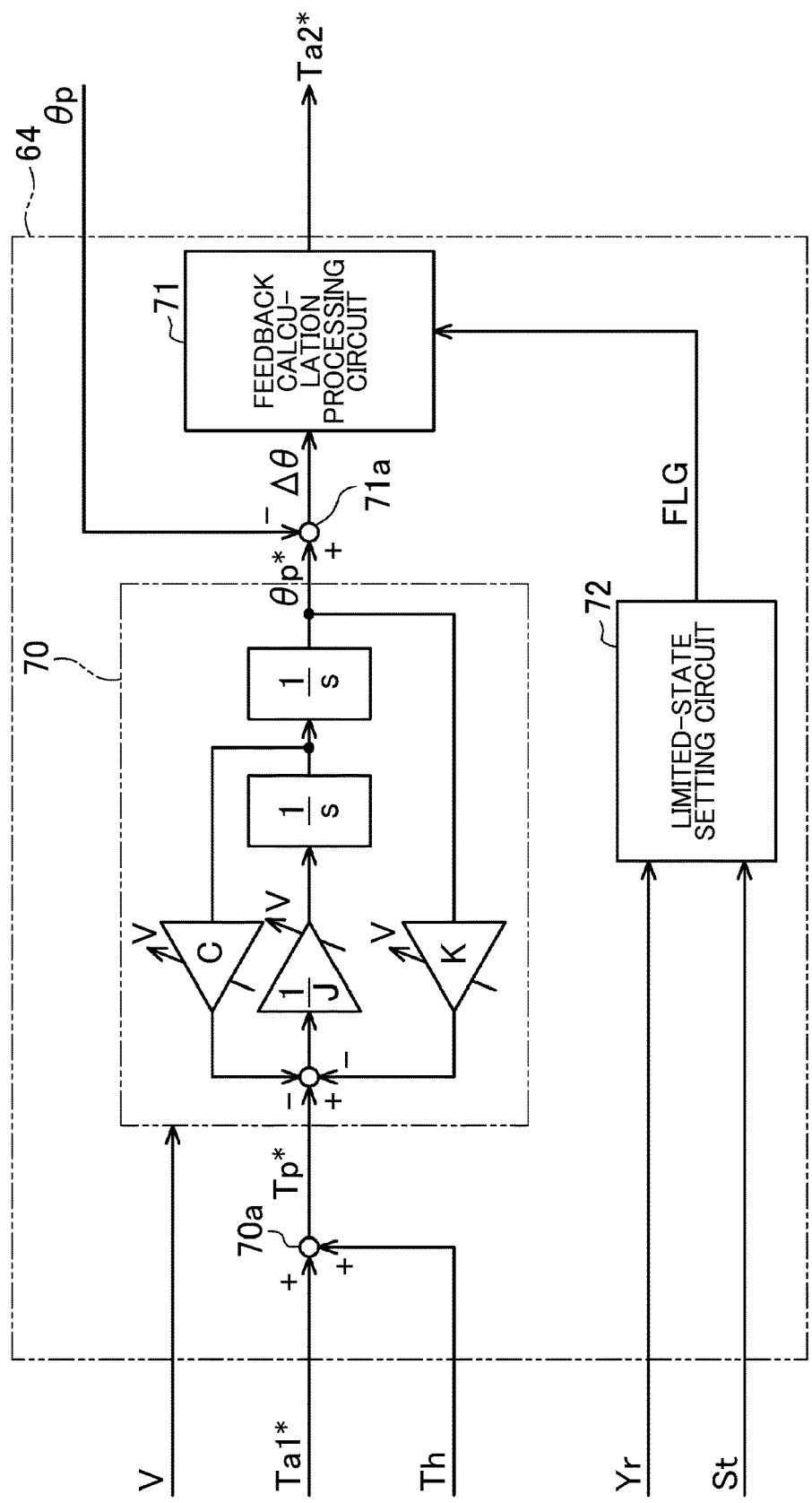
FIG. 3 is a block diagram illustrating a configuration of a rotation angle feedback control circuit of a microcomputer.

As illustrated in FIG. 3, the rotation angle feedback control circuit 64 includes a rotation angle command value calculation circuit 70 and a feedback calculation processing circuit 71. The rotation angle command value calculation circuit 70 receives a torque command value Tp* calculated through summation of the first assist component Ta1* and the steering torque Th, which is executed by a summation processing circuit 70a. The torque command value Tp* can be regarded as an input torque transmitted to the pinion shaft 11c. The rotation angle command value calculation circuit 70 calculates a rotation angle command value θp* based on the torque command value Tp*. In this case, a model formula expressed by the following equation (c1) for associating the torque command value Tp* with the rotation angle command value θp* is used.

$$Tp^* = K \cdot \theta p^* + C \cdot \theta p^{*\prime} + J \theta p^{*\prime\prime} \qquad (c1)$$

A model expressed by Equation (c1) specifies the relationship between a torque of the pinion shaft 11c that rotates in accordance with the rotation of the steering wheel 10 and a rotation angle (pinion angle) of the pinion shaft 11c. In Equation (c1), a viscosity coefficient C is a modeled friction or the like in the EPS 1. An inertia coefficient J is a modeled inertia in the EPS 1. A spring constant K is a modeled specification of a suspension, wheel alignment, or the like in the vehicle equipped with the EPS 1. The viscosity coefficient C, the inertia coefficient J, and the spring constant K are variably set based on the vehicle speed value V.

The feedback calculation processing circuit 71 receives a deviation Δθ that is a deviation between the rotation angle command value θp* and the rotation angle θp, which is calculated by a deviation processing circuit 71a. The feedback calculation processing circuit 71 calculates the second assist component Ta2* as a controlled variable used to adjust the rotation angle θp to the rotation angle command value θp* through feedback control. The feedback calculation processing circuit 71 calculates, as the second assist component Ta2*, the sum of output values of a proportional element, an integral element, and a derivative element based on the deviation Δθ that is an input. The second assist component Ta2* is an example of a second component.

Referring again to FIG. 2, the second assist component Ta2* calculated by the feedback calculation processing circuit 71 is input into a summation processing circuit 65 along with the first assist component Ta1* calculated by the summation processing circuit 63. The assist command value calculation circuit 33 generates the assist command value Ta* based on a sum of the first assist component Ta1* and the second assist component Ta2*, which is calculated by the summation processing circuit 65. As described above, in the present embodiment, by controlling driving of the motor 20 based on the sum of the first assist component Ta1* and the second assist component Ta2*, it is possible to achieve favorable steering characteristics while reducing reverse input vibrations transmitted from the steered wheels 15 when a user's operation of the steering wheel 10 is assisted.

As illustrated in FIG. 3, the rotation angle feedback control circuit 64 includes a limited-state setting circuit 72 that sets and cancels a limited state where the second assist component Ta2* calculated by the feedback calculation processing circuit 71 is limited. As described above, in the vehicle speed sensor 42, the vehicle speed value V may be abnormal, for example, the vehicle speed value V may be stuck at a particular value. Such an abnormality of the vehicle speed sensor 42, that is, an abnormality of the vehicle speed value V, is determined by the vehicle ECU 50 that is provided separately from the steering ECU 30. Upon determining that the vehicle speed value V is abnormal, the vehicle ECU 50 outputs an abnormality signal St indicating that the vehicle speed value V is abnormal to the limited-state setting circuit 72 (that is, steering ECU 30 (the rotation angle feedback control circuit 64 of the microcomputer 31)). The vehicle ECU 50 determines, with a predetermined period, whether or not the vehicle speed value V is abnormal.

In the present embodiment, during an abnormality determination period during which the vehicle speed value V is determined to be abnormal, the vehicle speed value V detected by the vehicle speed sensor 42 is set to a preset provisional vehicle speed value V0. The provisional vehicle speed value V0 is set, for example, in the following manner. When the highest vehicle speed at which the user's operation of the steering wheel 10 can be assisted by the assist mechanism 3 is 100 km per hour, the provisional vehicle speed value V0 is set to 60 km per hour, which is higher than an intermediate value between the highest vehicle speed and a reference vehicle speed value Vth (for example, approximately zero km per hour) that is a vehicle speed indicating that the vehicle is stationary or traveling at a considerably low speed. That is, the provisional vehicle speed value V0 is higher than the reference vehicle speed value Vth. The provisional vehicle speed value V0 is input, instead of the vehicle speed value V, into the steering ECU 30 during the abnormality determination period. For example, the provisional vehicle speed value V0 may be input into the steering ECU 30 from a unit outside the steering ECU 30, such as the vehicle ECU 50, or may be generated by the microcomputer 31 of the steering ECU 30 and input into a required control circuit and a required processing circuit.

The limited-state setting circuit 72 receives the abnormality signal St output from the vehicle ECU 50, and the yaw rate Yr detected by the yaw rate sensor 43. The limited-state setting circuit 72 outputs, to the feedback calculation processing circuit 71, a limited-state flag FLG based on the abnormality signal St and the yaw rate Yr. The limited-state flag FLG indicates whether to set or cancel the limited state, which is associated with calculation of the of the second assist component Ta2*.

When a normal state where the limited state is cancelled is set by the limited-state flag FLG received from the limited-state setting circuit 72, the feedback calculation processing circuit 71 calculates the second assist component Ta2* as a controlled variable used to adjust the rotation angle θp to the rotation angle command value θp* through the feedback control. On the other hand, when the limited state is set by the limited-state flag FLG received from the limited-state setting circuit 72, the feedback calculation processing circuit 71 calculates the second assist component Ta2* such that the second assist component Ta2* is zero, thereby disabling the second assist component Ta2*. That is, in the present embodiment, when the limited state is set, the variation range (variation width) of the second assist component Ta2* is zero.

Figure 4:
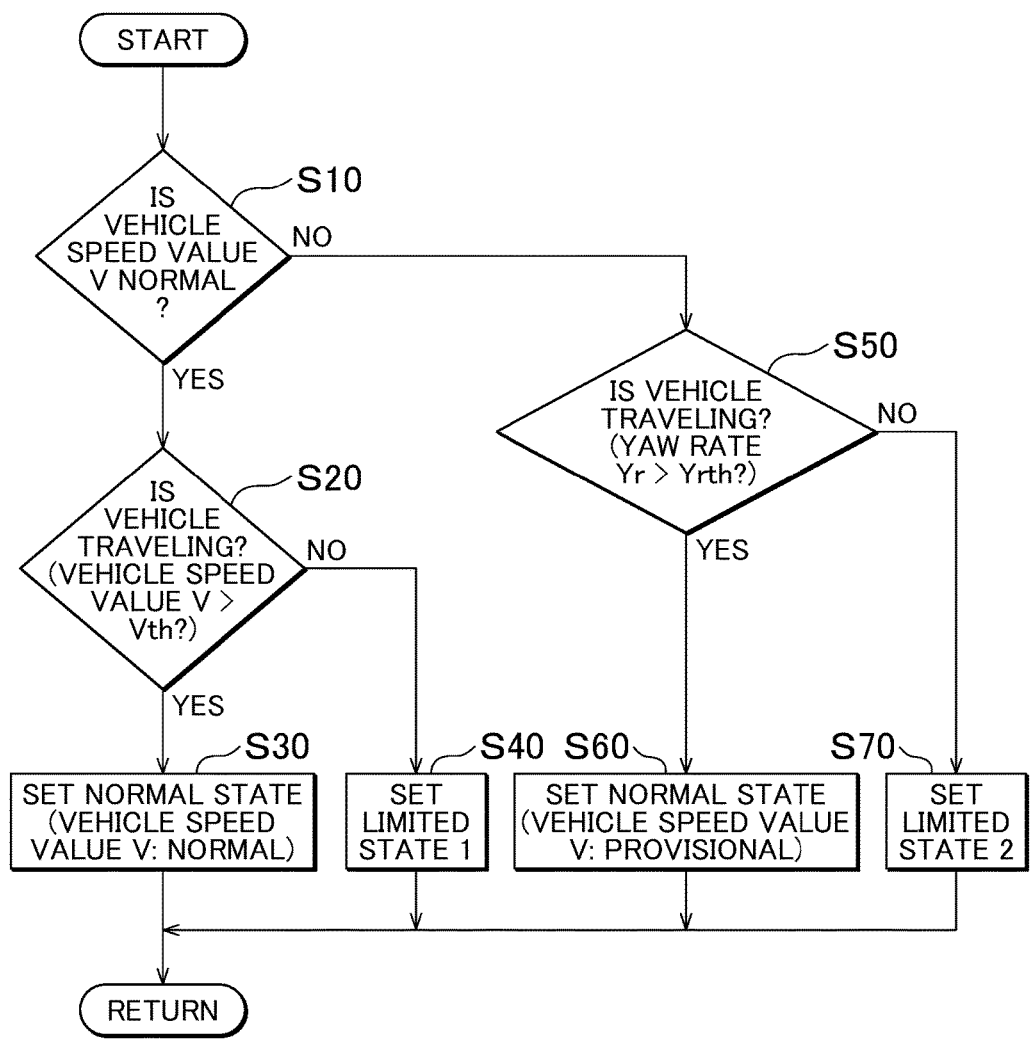
FIG. 4 is a flowchart illustrating a limited-state setting process.

Next, a limited-state setting process executed by the limited-state setting circuit 72 will be described. The limited-state setting circuit 72 repeatedly executes the following process with a predetermined period. As illustrated in FIG. 4, the limited-state setting circuit 72 determines whether or not the vehicle speed value V is normal based on the abnormality signal St (S10).

When the abnormality signal St is not input into the limited-state setting circuit 72 and the vehicle speed value V is normal (S10: YES), the limited-state setting circuit 72 determines whether or not the vehicle is traveling based on the vehicle speed value V (S20). In S20, the limited-state setting circuit 72 determines whether or not the vehicle speed value V is higher than the reference vehicle speed value Vth based on the vehicle speed value V. The reference vehicle speed value Vth is a vehicle speed corresponding to the reference value at and below which the vehicle is determined to be stationary or traveling at a considerably low speed. The reference vehicle speed value Vth is set to an empirically-obtained value at or below which it can be determined that the vehicle is not traveling, that is, the vehicle is stationary.

When the vehicle speed value V is higher than the reference vehicle speed value Vth and the vehicle is traveling (S20: YES), the limited-state setting circuit 72 outputs the limited-state flag FLG indicating the setting of the normal state to the feedback calculation processing circuit 71 (S30), and ends the limited-state setting process. In this case, the feedback calculation processing circuit 71 calculates the second assist component Ta2* as the controlled variable used to adjust the rotation angle θp to the rotation angle command value θp* through the feedback control. In this case, the basic assist control circuit 60 calculates the basic assist controlled variable Tas* based on the normal vehicle speed value V. That is, the first assist component Ta1* is calculated based on the basic assist controlled variable Tas* that is calculated based on the normal vehicle speed value V. In this case, the rotation angle command value calculation circuit 70 also calculates the rotation angle command value θp* based on the normal vehicle speed value V. In this case, the second assist component Ta2* is calculated based on the first assist component Ta1* (rotation angle command value θp*) that is calculated based on the normal vehicle speed value V.

On the other hand, when the vehicle speed value V is equal to or lower than the reference vehicle speed value Vth and the vehicle is stationary (S20: NO), the limited-state setting circuit 72 outputs the limited-state flag FLG indicating the setting a limited state 1 as the limited state to the feedback calculation processing circuit 71 (S40), and ends the limited-state setting process. In the case of the limited state 1, the feedback calculation processing circuit 71 calculates the second assist component Ta2* such that the second assist component Ta2* is zero. In the case of the limited state 1, the basic assist control circuit 60 calculates the basic assist controlled variable Tas* based on the normal vehicle speed value V. That is, the first assist component Ta1* is calculated based on the basic assist controlled variable Tas* that is calculated based on the normal vehicle speed value V. In the case of the limited state 1, the rotation angle command value calculation circuit 70 also calculates the rotation angle command value θp* based on the normal vehicle speed value V. In the case of the limited state 1, the second assist component Ta2* is calculated such that the second assist component Ta2* is zero, regardless of the first assist component Ta1* (rotation angle command value θp*).

When the abnormality signal St is input into the limited-state setting circuit 72 and the vehicle speed value V is abnormal (S10: NO), the limited-state setting circuit 72 determines whether or not the vehicle is traveling based on the yaw rate Yr (S50). In S50, the limited-state setting circuit 72 determines whether or not the yaw rate Yr is higher than a threshold Yrth based on the yaw rate Yr. The threshold Yrth is set to an empirically obtained value at or below which the vehicle is determined to be traveling at a vehicle speed equal to or lower than the reference vehicle speed value Vth, that is, the vehicle is determined to be stationary. When the vehicle speed value V is abnormal, unlike in S20, it is not possible to determine whether or not the vehicle is traveling based on the vehicle speed value V. However, it is possible to determine whether or not the vehicle is traveling based on the yaw rate Yr instead of the vehicle speed value V.

When the yaw rate Yr is higher than the threshold Yrth and the vehicle is traveling (S50: YES), the limited-state setting circuit 72 outputs the limited-state flag FLG indicating the setting of the normal state to the feedback calculation processing circuit 71 (S60), and ends the limited-state setting process. In this case, the feedback calculation processing circuit 71 calculates the second assist component Ta2* as the controlled variable used to adjust the rotation angle θp to the rotation angle command value θp* through the feedback control. However, in this case, the vehicle speed value V is determined to be abnormal in S10, and thus the provisional vehicle speed value V0 is input, as the vehicle speed value V, into the basic assist control circuit 60 instead of the actual traveling speed of the vehicle. Thus, the basic assist control circuit 60 calculates the basic assist controlled variable Tas* based on the provisional vehicle speed value V0. That is, the first assist component Ta1* is calculated based on the basic assist controlled variable Tas* that is calculated based on the provisional vehicle speed value V0. In this case, the rotation angle command value calculation circuit 70 also calculates the rotation angle command value θp* based on the provisional vehicle speed value V0. In this case, the second assist component Ta2* is calculated based on the first assist component Ta1* (rotation angle command value θp*) that is calculated based on the provisional vehicle speed value V0.

On the other hand, when the yaw rate Yr is equal to or lower than the threshold Yrth and the vehicle is stationary (S50: NO), the limited-state setting circuit 72 outputs the limited-state flag FLG indicating the setting of a limited state 2 as the limited state to the feedback calculation processing circuit 71 (S70), and ends the limited-state setting process. In the case of the limited state 2, the feedback calculation processing circuit 71 calculates the second assist component Ta2* such that the second assist component Ta2* is zero. In the case of the limited state 2, the basic assist control circuit 60 calculates the basic assist controlled variable Tas* based on the provisional vehicle speed value V0. That is, the first assist component Ta1* is calculated based on the basic assist controlled variable Tas* that is calculated based on the provisional vehicle speed value V0. In the case of the limited state 2, the rotation angle command value calculation circuit 70 also calculates the rotation angle command value θp* based on the provisional vehicle speed value V0. In the case of the limited state 2, the second assist component Ta2* is calculated such that the second assist component Ta2* is zero, regardless of the first assist component Ta1* (rotation angle command value θp*).

The present embodiment described above produces the following advantageous effects.

(1) As illustrated in FIG. 5, when the vehicle speed value V is normal (S10: YES) and the vehicle is traveling (S20: YES) as a result of the limited-state setting process, the first assist component Ta1* is calculated based on the normal vehicle speed value V. In this case, the second assist component Ta2* is calculated and enabled, based on the first assist component Ta1* and the rotation angle command value θp* that are calculated based on the normal vehicle speed value V.

As illustrated in FIG. 5, when the vehicle speed value V is normal (S10: YES) and the vehicle is stationary (S20: NO) as a result of the limited-state setting process, the first assist component Ta1* is calculated based on the normal vehicle speed value V. In this case, regardless of the first assist component Ta1* and the rotation angle command value θp* that are calculated based on the normal vehicle speed value V, the limited state 1 is set. In the limited state 1, the second assist component Ta2* is calculated to be zero and disabled.

In contrast to this, as illustrated in FIG. 5, when the vehicle speed value V is abnormal (S10: NO) and the vehicle is traveling (S50: YES) as a result of the limited-state setting process, the first assist component Ta1* is calculated based on the provisional vehicle speed value V0. In this case, the second assist component Ta2* is calculated and enabled based on the first assist component Ta1* and the rotation angle command value θp* that are calculated based on the provisional vehicle speed value V0.

On the other hand, as illustrated in FIG. 5, when the vehicle speed value V is abnormal (S10: NO) and the vehicle is stationary (S20: NO) as a result of the limited-state setting process, the first assist component Ta1* is calculated based on the provisional vehicle speed value V0. In this case, regardless of the first assist component Ta1* and the rotation angle command value θp* that are calculated based on the provisional vehicle speed value V0, the limited state 2 is set. In the limited state 2, the second assist component Ta2* is calculated to be zero and disabled.

As described above, when the vehicle speed value V is normal, the influence of the second assist component Ta2*, output from the feedback calculation processing circuit 71, on the user's operation of the steering wheel 10 is substantially disabled based on the normal vehicle speed value while the vehicle is stationary (limited state 1). That is, when the vehicle is stationary, the influence of the second assist component Ta2* on the user's operation of the steering wheel 10 is substantially disabled to allow the user to appropriately operate the steering wheel 10.

On the other hand, in the present embodiment, during the abnormality determination period during which the vehicle speed value V is determined to be abnormal, the vehicle speed value V is set to the provisional vehicle speed value V0. With this configuration, the first assist component Ta1* can be calculated based on the provisional vehicle speed value V0. Thus, even during the abnormality determination period during which the vehicle speed value V is determined to be abnormal, an assist torque based on the first assist component Ta1* can be applied in response to the user's operation of the steering wheel 10.

However, in this case, if the second assist component Ta2*, as well as the first assist component Ta1*, can be calculated based on the provisional vehicle speed value V0, the influence of the second assist component Ta2* is exerted on the user's operation of the steering wheel 10 even when the vehicle is actually stationary. As a result, the user cannot appropriately perform an operation of the steering wheel 10.

In view of this, as illustrated in FIG. 5, when the vehicle speed value V is abnormal (S10: NO) and the vehicle is stationary (S50: NO), the influence of the second assist component Ta2* on the user's operation of the steering wheel 10 is substantially disabled (limited state 2). Consequently, during the abnormality determination period, the influence of the second assist component Ta2* on the user's operation of the steering wheel 10 can be limited, while an assist torque based on the first assist component Ta1* is applied in response to the user's operation of the steering wheel 10. Thus, even when the vehicle speed value V is abnormal, the user can appropriately operate the steering wheel 10.

(2) During the abnormality determination period, the case where the second assist component Ta2* is disabled is limited to the case where the vehicle is stationary instead of traveling. In this case, even during the abnormality determination period, when the vehicle is traveling, the influence of the second assist component Ta2* on the user's operation of the steering wheel 10 is enabled within the range of characteristics of the provisional vehicle speed value V0. Thus, even when the vehicle speed value V is abnormal, the user's operation of the steering wheel 10 can be suitably assisted.

(3) Even when the vehicle speed value V is abnormal, the abnormality may be a temporary abnormality. That is, even when the vehicle speed value V becomes abnormal, the vehicle speed value V may subsequently become no longer abnormal. If the second assist component Ta2* is disabled even when the vehicle speed value V is no longer abnormal, the original function to assist the operation of the steering wheel 10 is just deteriorated.

In view of this, in the present embodiment, the limited-state setting process is repeatedly executed with a predetermined period. Thus, after the limited state 2 (S70) is set because the vehicle speed value is abnormal (S10: NO), the limited state 2 is canceled (S30) when the vehicle speed value V is determined to be normal (S10: YES).

Thus, the case where the second assist component Ta2* is disabled is limited to the minimum necessary case. Consequently, even if the second assist component Ta2* is disabled when the vehicle speed value V is abnormal, deterioration of the original function to assist the operation of the steering wheel 10 can be minimized.

The above-described embodiment can be implemented in the following manners. The second assist component Ta2* may be disabled by stopping the calculation of the second assist component Ta2* by the feedback calculation processing circuit 71 or by inputting zero, as the deviation $\Delta\theta$, into the feedback calculation processing circuit 71. Alternatively, the second assist component Ta2* may be disabled by multiplying the second assist component Ta2* calculated by the feedback calculation processing circuit 71, by a gain.

The limited state 2 may be prevented from being cancelled unless a particular action is taken at a maintenance facility, for example, information stored in the steering ECU 30 is cleared or reset. The limited state 2 may be set and cancelled in the following manner. When a certain time has elapsed after the limited state 2 is set, the limited state 2 is temporarily cancelled. Subsequently, whether or not the vehicle speed value V is normal is determined, and the limited state 2 is set and cancelled based on the result of determination.

In the determination in S50 of the limited-state setting process, instead of the yaw rate Yr, an acceleration that acts in the front-rear direction of the vehicle when the vehicle is turned may be used. In this case, the vehicle is provided with an acceleration sensor, that is, a so-called G sensor. Both the yaw rate Yr and the acceleration may be taken into account in the process in S50 of the limited-state setting process. In the determination in S50 of the limited-state setting process, various kinds of information may be used. The various kinds of information indicate the traveling state of the vehicle including an environment surrounding the vehicle, which is recognized by a global positioning system (GPS), such as a car navigation system, various sensors, such as a camera, a distance sensor, and a radar, or vehicle-to-roadside communication. In particular, even in the case where the vehicle speed value V is abnormal, when the traveling speed of the vehicle can be detected by a GPS, such as a car navigation system, or a camera, the second assist component Ta2* may be calculated based on the detected traveling speed.

In the limited-state setting process, the process in S50 may be omitted. In this case, when the vehicle speed value V is abnormal, the limited state 2 is set without fail. As a result, at least the second assist component Ta2* is disabled while the vehicle is stationary. In this modified example, even when the vehicle speed value V is abnormal, the user can more appropriately operate the steering wheel 10 while the vehicle is stationary.

In the limited state 2, an upper limit value or a lower limit value of the second assist component Ta2* need to be more limited, that is, the variation range of the second assist component Ta2* need to be more limited, than when the vehicle speed value V is normal. In this case, the variation range of the second assist component Ta2* may be limited by, for example, multiplying the second assist component Ta2* calculated by the feedback calculation processing circuit 71, by a gain. In the limited state 2, fixed values may be calculated as the deviation $\Delta\theta$ and the second assist component Ta2*. In this case, an upper limit value or a lower limit value (variation range) of each of these fixed values need to be more limited than when the vehicle speed value V is normal.

In the assist command value calculation circuit 33, the phase compensation control circuit 61 and the torque differentiation control circuit 62 may be omitted. The phase compensation control circuit 61 and the torque differentiation control circuit 62 may replace the content of the compensation component with another element and execute calculation, or may use a plurality of elements as a compensation component and execute calculation.

The steering ECU 30 itself may detect an abnormality of the vehicle speed value V. For example, the steering ECU 30 may determine whether or not the vehicle is traveling based on the yaw rate Yr, and detect an abnormality of the vehicle speed value V, for example, when the vehicle speed value V is not zero although the yaw rate Yr indicates that the vehicle is stationary. Such an abnormality of the vehicle speed value V may be detected based on the acceleration that acts in the front-rear direction of the vehicle (by the G sensor), or by a wheel speed sensor provided in the steered wheels 15 in association with the vehicle speed sensor 42.

The rotation angle command value calculation circuit 70 may use a model formula obtained through modeling executed without taking a spring term into account. The rotation angle command value calculation circuit 70 may take the yaw rate Yr into account when calculating the rotation angle command value $\theta p^*$.

In the above-described embodiment, the second assist component Ta2* is limited by being disabled in each of the limited state 1 and in the limited state 2. However, the manner of limiting the second assist component Ta2* may be varied between the limited state 1 and the limited state 2. For example, the second assist component Ta2* may be disabled in one of the limited state 1 and the limited state 2, whereas the upper limit value or the lower limit value (variation range) of the second assist component Ta2* may be limited in the other one of the limited state 1 and the limited state 2.

In the above-described embodiment, the EPS 1 is a column-assist EPS in which an assist torque is applied to the steering shaft 11. However, the EPS 1 may be a rack-assist EPS. In this case, for example, the torque sensor 40 is provided on the pinion shaft 11c.

In the above-described embodiment, the invention is applied to the EPS 1. However, the invention may be applied to systems other than the EPS 1. The invention may be applied to a steer-by-wire (SBW) steering system.

What is claimed is:

1. A steering control system comprising:
a steering operation processing circuit that controls a controlled variable for a motor so as to apply a steering force for steering steered wheels to a steering device in response to an operation of a steering wheel, wherein the steering operation processing circuit comprises:
- a basic controlled variable calculation circuit that calculates a first component that is a basic component of the controlled variable for the motor, based on a vehicle speed value that is a detected value of a traveling speed of a vehicle and a steering torque that is a detected value of a load applied to the steering wheel;
- a rotation angle command value calculation circuit that calculates a rotation angle command value for a rotary shaft of the motor, based on at least the vehicle speed value and a torque command value, the torque command value being a summation of the steering torque and the first component, and the rotation angle command value being convertible into a steered angle of the steered wheels;
- a feedback calculation processing circuit that calculates a second component of the controlled variable for the motor, the second component being a difference between the rotation angle command value and a rotation angle of the rotary shaft, the second component being used to adjust a rotation angle of the rotary shaft to the rotation angle command value through feedback control, and the rotation angle of the rotary shaft being a detected value;
- a control processing circuit that controls an operation of the motor based on the controlled variable for the motor, the controlled variable being a summation of the first component and the second component; and
- a limited-state setting circuit that sets a first limited state when the vehicle speed is determined to be normal and the vehicle speed value is equal to or lower than a reference vehicle speed value that is a reference value at or below which it is determined that the vehicle is not traveling, the first limited state being a state where a variation range of the second component is more limited than when the vehicle speed value is higher than the reference vehicle speed value, wherein the steering operation processing circuit sets the vehicle speed value to a provisional vehicle speed value that is higher than the reference vehicle speed value, during an abnormality determination period during which the vehicle speed value is determined to be abnormal, the basic controlled variable calculation circuit calculates the first component based on the provisional vehicle speed value during the abnormality determination period, during the abnormality determination period, when the vehicle speed is determined to be abnormal and the vehicle is not traveling, the limited-state setting circuit sets a second limited state, the second limited state being a state where the variation range of the second component is more limited than when the vehicle speed value is normal, the vehicle speed value is abnormal when: (i) the vehicle speed value is stuck at a particular value; or (ii) when the vehicle speed value is not equal to zero although a yaw rate of the vehicle indicates that the vehicle is stationary, and the vehicle speed value is normal when the vehicle speed value is not abnormal.

2. The steering control system according to claim 1, wherein the second component is limited by being disabled during the abnormality determination period.

3. The steering control system according to claim 2, wherein the limited-state setting circuit is configured to limit the second component during the abnormality determination period, when it is determined that the vehicle is not traveling based on a detected value of a physical quantity related to the vehicle, other than the vehicle speed value.

4. The steering control system according to claim 2, wherein the limited-state setting circuit is configured to cancel a limitation of the second component when it is determined that the vehicle speed value is no longer abnormal, after the limitation is imposed on the second component during the abnormality determination period.

5. The steering control system according to claim 2, wherein the second component is disabled by being set to zero during the abnormality determination period.

6. A steering control system for controlling a controlled variable for a motor so as to apply a steering force for steering steered wheels to a steering device in response to an operation of a steering wheel comprising:
a computer programmed to:
- calculate a first component that is a basic component of the controlled variable for the motor, based on a vehicle speed value that is a detected value of a traveling speed of a vehicle and a steering torque that is a detected value of a load applied to the steering wheel;
- calculate a rotation angle command value for a rotary shaft of the motor, based on at least the vehicle speed value and a torque command value, the torque command value being a summation of the steering torque and the first component, and the rotation angle command value being convertible into a steered angle of the steered wheels;
- calculate a second component of the controlled variable for the motor, the second component being a difference between the rotation angle command value and a rotation angle of the rotary shaft, the second component being used to adjust a rotation angle of the rotary shaft to the rotation angle command value through feedback control, and the rotation angle of the rotary shaft being a detected value;
- control an operation of the motor based on the controlled variable for the motor, the controlled variable being a summation of the first component and the second component; and
- make a first determination of whether the vehicle speed value is normal or abnormal, the vehicle speed value being abnormal when: (i) the vehicle speed value is stuck at a particular value; or (ii) when the vehicle speed value is not equal to zero although a yaw rate of the vehicle indicates that the vehicle is stationary, and the vehicle speed value being normal when the vehicle speed value is not abnormal;
- make a second determination of whether or not the vehicle is traveling, by determining whether the vehicle speed value is equal to or lower than a reference vehicle speed value that is a reference value at or below which it is determined that the vehicle is not traveling;

set a first limited state, a second limited state and a normal state based on the first determination and the second determination;

when the first determination indicates that the vehicle speed value is normal and the second determination indicates that the vehicle is not traveling, set the first limited state, the first limited state being a state where the first component is calculated based on the vehicle speed value and the second component is calculated to be zero and disabled;

when the first determination indicates that the vehicle speed value is abnormal and the second determination indicates that the vehicle is traveling, set the normal state, the normal state being a state where the first component is calculated based on a provisional vehicle speed value that is higher than the reference vehicle speed value, and the second component is calculated and enabled based on the first component; and when the first determination indicates that the vehicle speed value is abnormal and the second determination indicates that the vehicle is not traveling, set the second limited state, the second limited state being a state where the first component is calculated based on the provisional vehicle speed value and the second assist component is calculated to be zero and disabled.

* * * * *